(12) United States Patent
Aya et al.

(10) Patent No.: US 12,026,129 B2
(45) Date of Patent: Jul. 2, 2024

(54) ATOMIC CACHE MANAGEMENT OF FILE COLLECTIONS

(71) Applicant: Snowflake Inc., Bozeman, MT (US)

(72) Inventors: Selcuk Aya, San Carlos, CA (US); Ju-yi Kuo, Sammamish, WA (US); Jonathan Lee Leang, Seattle, WA (US); Nitya Kumar Sharma, Bellevue, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/657,229

(22) Filed: Mar. 30, 2022

(65) Prior Publication Data

US 2023/0315693 A1    Oct. 5, 2023

(51) Int. Cl.
| | | |
|---|---|---|
| *G06F 15/16* | (2006.01) | |
| *G06F 16/17* | (2019.01) | |
| *G06F 16/172* | (2019.01) | |
| *G06F 16/176* | (2019.01) | |

(52) U.S. Cl.
CPC ........ *G06F 16/1774* (2019.01); *G06F 16/172* (2019.01); *G06F 16/1734* (2019.01)

(58) Field of Classification Search
None
See application file for complete search history.

(56) References Cited

U.S. PATENT DOCUMENTS

| | | | | |
|---|---|---|---|---|
| 9,569,367 B1 * | 2/2017 | Wigmore | ............ | G06F 12/0868 |
| 2005/0125607 A1 * | 6/2005 | Chefalas | ............. | G06F 12/0862 |
| | | | | 711/E12.019 |
| 2006/0064549 A1 * | 3/2006 | Wintergerst | .......... | G06F 12/121 |
| | | | | 711/134 |
| 2006/0143396 A1 * | 6/2006 | Cabot | ................... | G06F 12/121 |
| | | | | 711/134 |
| 2008/0071992 A1 * | 3/2008 | Chetuparambil | ..... | G06F 12/121 |
| | | | | 711/E12.07 |
| 2012/0072400 A1 * | 3/2012 | Allred | ................. | G06F 16/1774 |
| | | | | 707/704 |
| 2014/0129779 A1 * | 5/2014 | Frachtenberg | ........ | G06F 12/123 |
| | | | | 711/136 |

OTHER PUBLICATIONS

Amer et al. Group-Based Management of Distributed File Caches. ICDCS'02, pp. 1-10. (Year: 2002).*
Mvondo et al. OFC: an opportunistic caching system for FaaS platforms. EuroSys'21, pp. 228-244. (Year: 2021).*

* cited by examiner

*Primary Examiner* — Alex Gofman
*Assistant Examiner* — Shelly X Qian
(74) *Attorney, Agent, or Firm* — Schwegman Lundberg & Woessner, P.A.

(57) ABSTRACT

Systems and methods for caching file system collections atomically. The systems and methods perform operations comprising: receiving a request to access a collection of data comprising a plurality of files stored on a storage device; in response to receiving the request, transferring the collection of data from the storage device to a first subfolder in a cache associated with the storage device; generating a lock file comprising a reference to the first subfolder in the cache; and atomically controlling access to the collection of data in the first subfolder and removal of the collection of data in the first subfolder from the cache via the lock file.

30 Claims, 8 Drawing Sheets

ATOMIC CACHE MANAGEMENT OF FILE COLLECTIONS

TECHNICAL FIELD

Embodiments of the disclosure relate generally to data platforms and databases and, more specifically, to managing caches associated with non-volatile storage devices of such data platforms and databases.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The speed at which various operations can be performed is impacted by the cache management of the storage devices associated with the databases.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
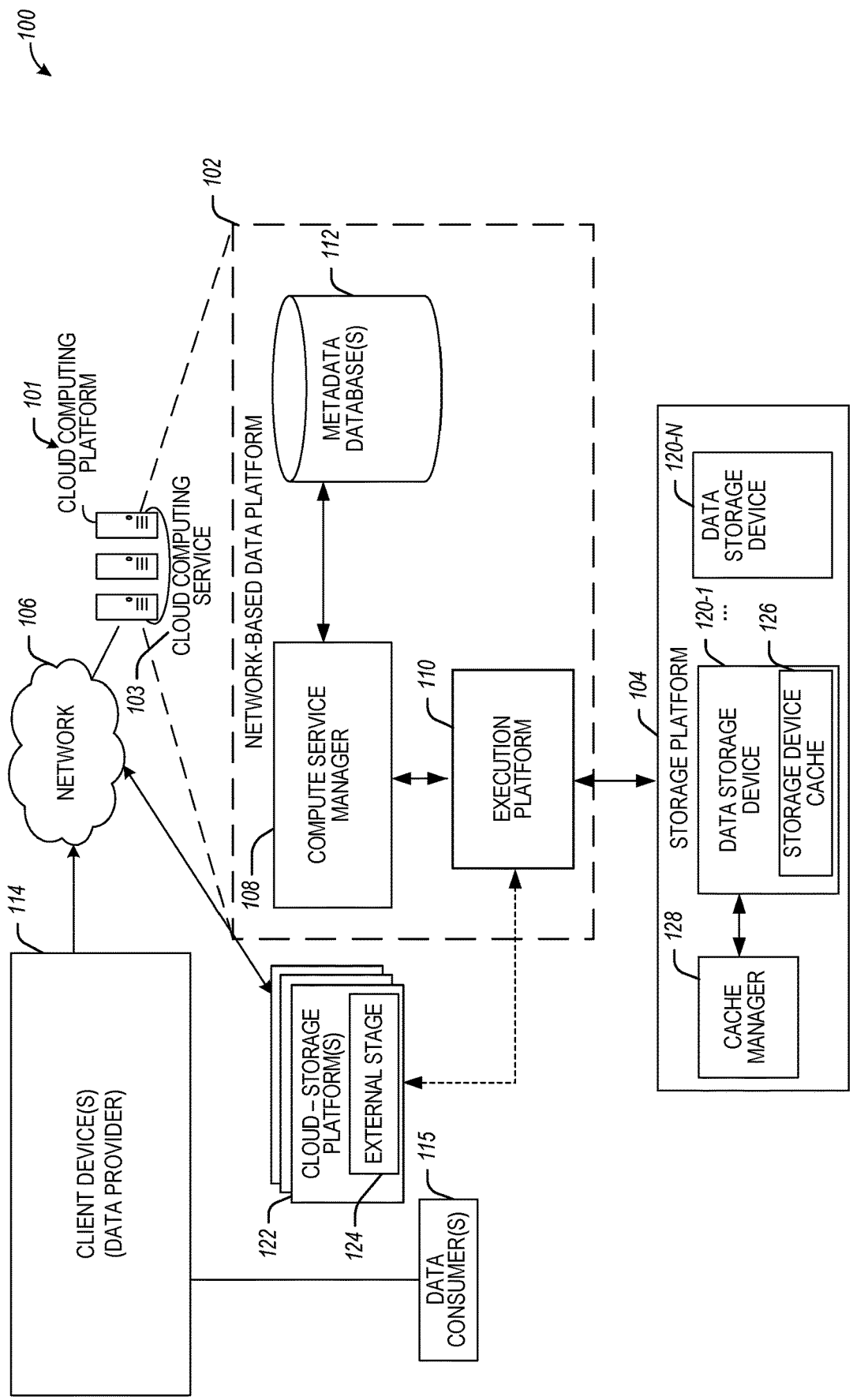
FIG. 1 illustrates an example computing environment that includes a network-based data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein.

The database(s) are typically stored on a non-volatile storage device, such as a hard disk drive (HDD) or on a remote storage device, such as in a cloud computing platform on one or more server storage devices. Data read from the HDD is usually moved to a cache temporarily to enable caller processes to quickly operate on the data stored on the cache. The cache can be an on-board cache that is physically part of the HDD or can be a separate volatile storage device, such as random access memory (RAM) associated with one or more non-volatile storage devices. Once the data becomes stale or unused for some time, the data is evicted from the cache (e.g., moved from the cache back to the HDD).

In conventional data platforms, the movement of the data from the HDD(s) to the associated cache(s) or from a remote storage layer to a local execution node's persistent storage, and the handling of eviction from the cache is performed on a file-by-file basis. For example, a given caller process can request access to a particular package of data (which can be a plurality of files that can be treated by a process as a single unit of data). In response, that package of data can be moved from the storage device (e.g., a remote storage device) to the associated cache (or local execution node's storage). The caller process can then read/write the data that has been moved to the cache by directly interacting with the data. In some cases, a cache manager can determine that part of the package of data, such as one or more files, has become stale or needs to be evicted from the cache while the caller process is currently operating on a different set of files that are part of the package of data. In response, the cache manager can evict those one or more files without evicting the other files that are part of the same collection of data which are currently being used by the caller process. However, the files being used by the caller process can have a relationship to the files that have been evicted which results in the entire package of data becoming corrupt. To address this corruption, the caller process must again request that the entire package of data be moved back to the cache so the caller process can reperform the requisite operations.

These processes of reinstating the package of data into the cache are incredibly inefficient and result in waste of time and network and processing device resources. This can also result in the creation of copies of data onto unmanaged portions of the disk which can waste storage space. A typical file system disk cache does not provide a way to group files together such that there are guarantees that either all files within a package of data exist in the cache or none do. Namely, the conventional system does not provide a way to treat a group of files atomically.

Aspects of the present disclosure include systems, methods, and devices to address, among other problems, the aforementioned shortcomings of conventional data platforms by performing cache management of a collection of files on an atomic basis. The collection of files that are managed atomically can be referred to as artifacts (e.g., directories and their respective contents). In an example, a data platform receives a request to access a collection of data that can include a plurality of files stored on a non-volatile storage device, such as a remote storage device. In response to receiving the request, the data platform transfers the collection of data from the non-volatile storage device to a first subfolder in a cache associated with the non-volatile storage device (e.g., the storage device of a local execution node). The data platform generates a lock file that includes a reference to the first subfolder in the cache and atomically controls access to the collection of data in the first subfolder and removal (eviction) of the collection of data in the first subfolder from the cache via the lock file.

Specifically, a disk cache is provided that provides a layer of indirection between the cache management layer and the artifacts through "lock files" associated to each artifact. The caller interface that is provided allows artifacts to be put into the cache atomically and can generate an associated lock file. Calls to access the artifacts do so by first checking on the status (e.g., shared/exclusive lock status) of the artifact's respective lock file (this logic also applies to artifact eviction).

By performing atomic handling of a collection of data stored in the cache in this manner, the data platform increases utilization of execution node processing capability and avoids waste of resources and inefficient use of resources by preventing a collection of files (e.g., related files) from being evicted from the cache on an individual file basis. Specifically, the lock file is used to control access and eviction of a collection of related files. This ensures that files in the collection of files can only be evicted from the cache on an all or none basis so that if a particular caller process is currently using one of the files in the collection, no other file that is part of the same collection can be evicted from the cache while the caller process is using one the files in the collection.

FIG. 1 illustrates an example computing environment 100 that includes a data platform in the example form of a network-based data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based data platform 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts.

The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, a users account object lists users authorized to access at least one target account (e.g., an account of a data provider or data consumer 115). In some embodiments, a roles account object configures privileges for the users to access the at least one target account. In some aspects, a warehouse object indicates compute resources (e.g., at least one virtual warehouse of the execution platform 110) for executing a workload associated with one or more databases of the data provider. In some embodiments, a resource monitor object configures monitoring usage of the compute resources.

The compute service manager 108 is also coupled to one or more metadata databases 112 that store metadata about various functions and aspects associated with the network-based data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
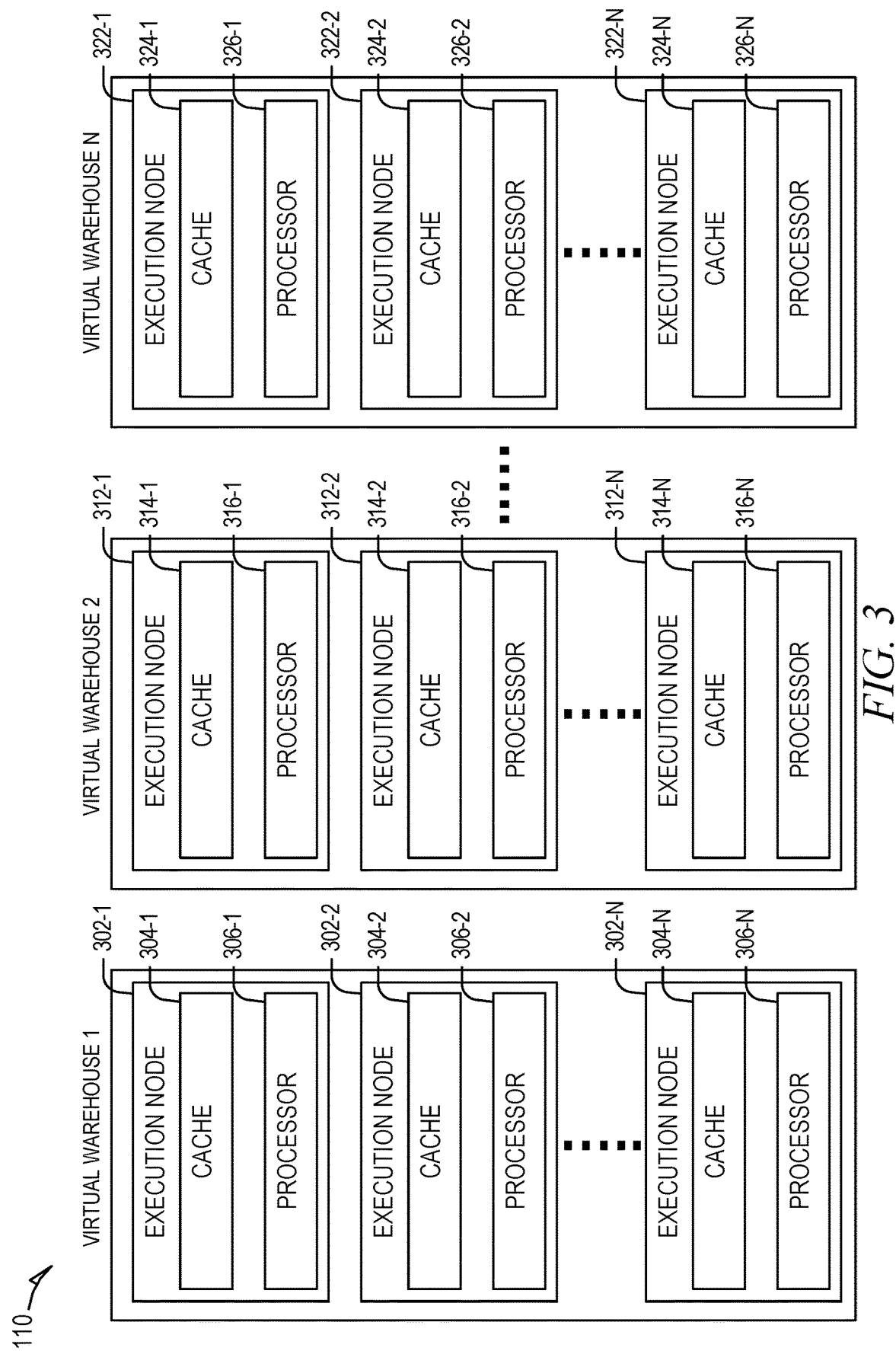
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like.

In some embodiments, at least one storage device cache 126 (e.g., an internal cache) may reside on one or more of the data storage devices 120-1-120-N, and at least one external stage 124 may reside on one or more of the cloud storage platforms 122. In some examples, a single storage device cache 126 can be associated with all of the data storage devices 120-1-120-N so that the single storage device cache 126 is shared by and can store data associated with any one of the data storage devices 120-1-120-N. In some examples, each data storage device data storage devices 120-1-120-N can include or implement a separate storage device cache 126. A cache manager 128 handles the transfer of data from the data storage devices 120-1-120-N to the storage device cache 126. The cache manager 128 handles the eviction of data from the storage device cache 126 to the respective associated data storage devices 120-1-120-N. The cache manager 128 handles the access to the data stored in the storage device cache 126 via one or more lock files associated with such data. The storage platform 104 can include one or more hard drives and/or can represent a plurality of hard drives distributed on a plurality of servers in a cloud computing environment.

Specifically, the cache manager 128 can receive a request to access a collection of data (e.g., a package or library of files) that includes a plurality of files stored on a non-volatile storage device (e.g., storage device 120-1). In response to receiving the request, the cache manager 128 transfers the collection of data from the storage device 120-1 to a first subfolder in the storage device cache 126 associated with the storage device 120-1. The cache manager 128 generates a lock file that includes a reference to the first subfolder in the storage device cache 126. The cache manager 128 atomically controls access to the collection of data in the first subfolder and removal (eviction) of the collection of data in the first subfolder from the cache via the lock file. In this way, the cache manager 128 can increase utilization of execution node processing capability and avoids waste of resources and inefficient use of resources by preventing a collection of files (e.g., related files) from being evicted from the storage device cache 126 on an individual file basis. This ensures that files in the collection of files can only be evicted from the cache on an all or none basis so that if a particular caller process is currently using one of the files in the collection, no other file that is part of the same collection can be evicted from the storage device cache 126 while the caller process (e.g., user application or operating system process) is using one the files in the collection. Further details of the cache manager 128 and the storage device cache 126 are provided below in connection with FIGS. 4-7.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described embodiments, the network-based data platform 102 is dynamic and supports regular changes to meet the current data processing needs.

During a typical operation, the network-based data platform 102 processes multiple jobs (e.g., operators of subplans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or RAM) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various embodiments, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks and each block stores at least a portion of a column of the database. Each execution node provides multiple threads of execution, and in performing a table scan, multiple threads perform a parallel scan of the set of blocks of a file, which may be selected from a scan set corresponding to a subset of the set of files into which the database is organized.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
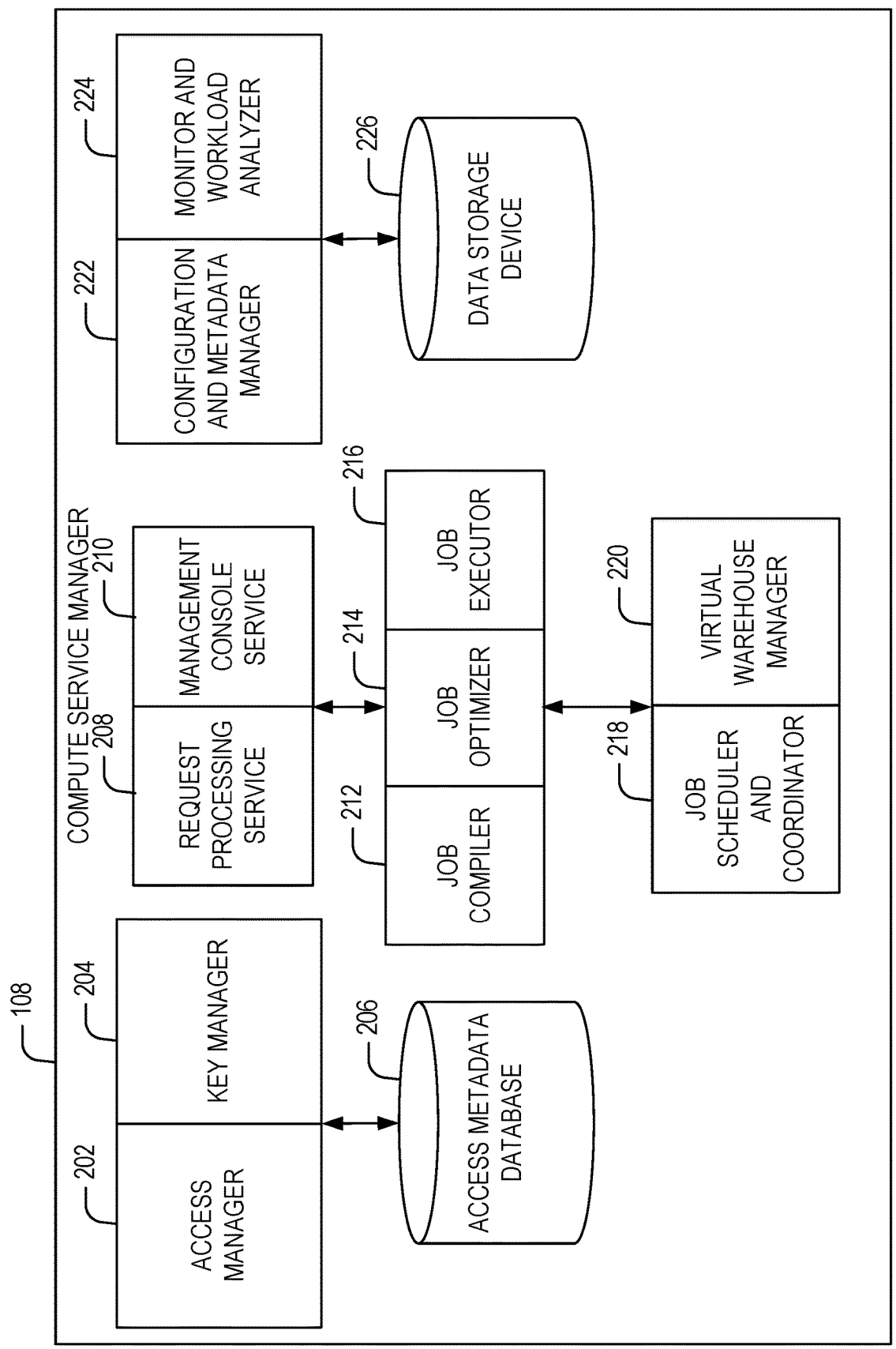
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104. The techniques described with respect to the cache manager 128 of the storage platform 104 (e.g., a HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
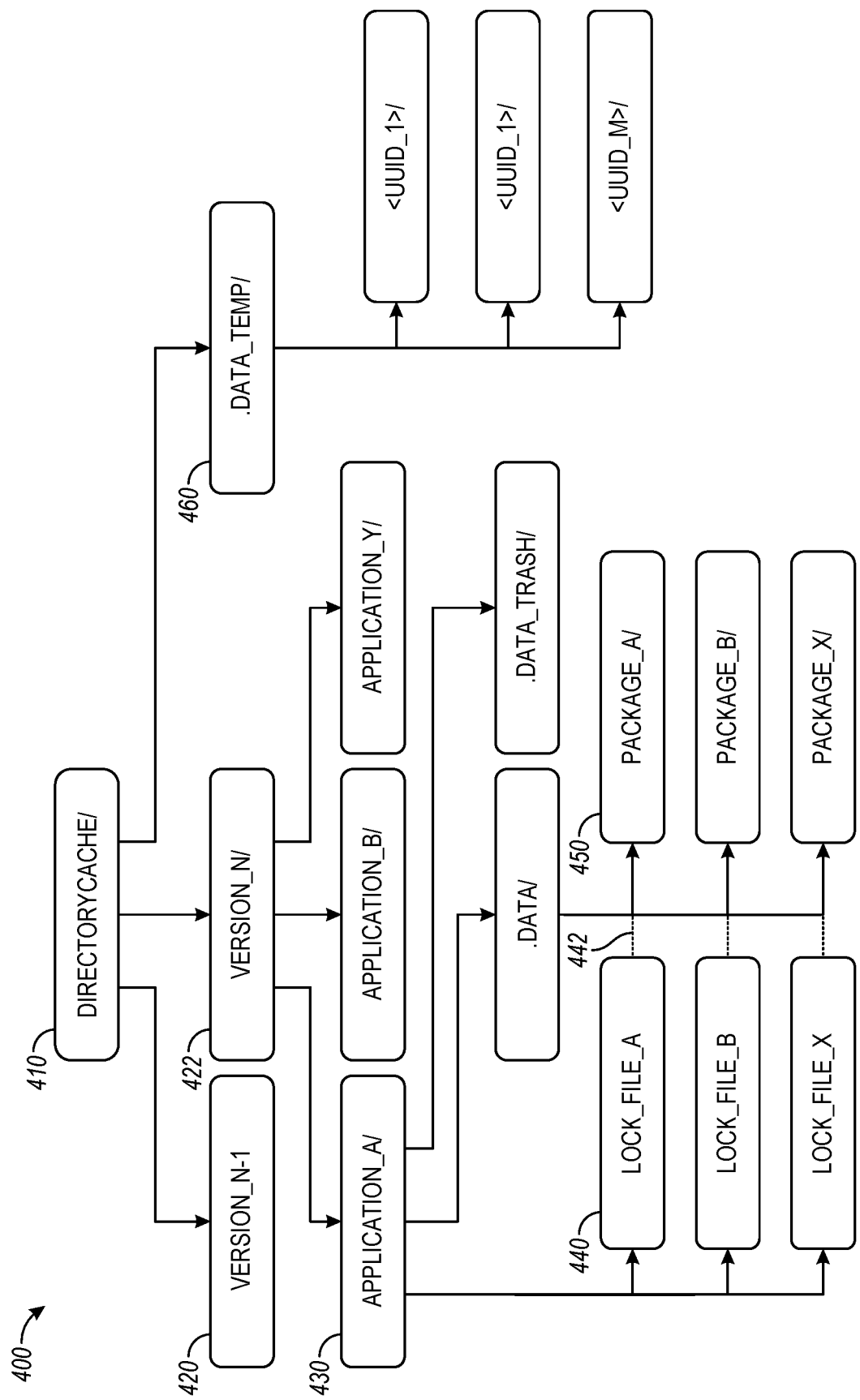
FIG. 4 is a block diagram of a cache associated with a non-volatile storage device of a data platform, in accordance with some embodiments of the present disclosure.

FIG. 4 is a block diagram illustrating an example of the storage device cache 400 (e.g., storage device cache 126) of the data storage device 120-1, in accordance with some embodiments of the present disclosure. The storage device cache 126 can include a root directory 410 and one or more versions including a first version 420 and a second version 422. The storage device cache 126 can also include one or more temporary directories 460. The second version 422 can include one or more application folders including a first application folder 430. The first application folder 430 can be associated with one or more packages that each include a plurality of files. For example, the first application folder 430 can be associated with a first package or collection of files 450 that is stored in a first subfolder (e.g., a hidden folder).

The version subfolders can prevent namespace collision. The application subfolders prevent namespace collision between different applications within the server. In the event that a data purge, cache reset, application metadata update, or any other large-scale cache operation is required, the version can be updated to provide a seamless transition into the new cache version. This is possible by keeping the old cache version subfolder where currently executing queries are still able to access the old cache data. Meanwhile newly executed queries will start to populate and use the new cache version subfolder.

A plurality of lock files including a first lock file 440 can be used to reference each respective package or collection of files and their respective hidden folders. For example, the first lock file 440 can include a reference 442 (e.g., a pointer, an address, a path, a filename and so forth) that points to the cache storage location of the subfolder which stores the first package or collection of files 450.

The cache manager 128 handles the access and removal of the collection of files stored in the package or collection of files by way of the respective lock files. For example, the cache manager 128 atomically handles the access and removal of the first collection of files 450 stored in the first package or collection of files 450 by way of the first lock file 440. Specifically, the cache manager 128 ensures that the contents of the subfolder that stores the first package or collection of files 450 is removed or evicted on an all or nothing basis so that no individual file that is part of the first package or collection of files 450 is removed without all of the other files being removed.

In some examples, the cache manager 128 receives a request to access a collection of files, such as from a caller process, that are currently stored on the non-volatile storage device, such as the data storage device 120-1 or on a remote storage device or cloud storage device. In response, the cache manager 128 retrieves the requested collection of files from the data storage device 120-1 or the cloud storage device or remote storage device and locally stores the files as part of an execution node's persistent storage.

The cache manager 128 identifies an application name associated with the caller process and finds the corresponding first application folder 430 associated with the caller process. The cache manager 128 generates the lock file 440 and stores the retrieved collection of files in the first collection of files 450 associated with the lock file 440. The cache manager 128 also stores a reference 442 in the lock file 440 that points to the first collection of files 450. The lock file 440 stores various information, such as a byte size of the first collection of files 450 (e.g., subfolder) and a lock status (e.g., whether a lock has been asserted and/or whether an exclusive lock has been asserted). In some cases, the lock status is managed by a separate process under the operating system. The lock file can be a key to a respective operating system managed lock status. In some examples, the lock file 440 can also store a timestamp representing when the first collection of files 450 was created or when the collection of files has been retrieved from the data storage device 120-1. In some examples, the timestamp is not stored in the lock file but stored elsewhere in memory by the cache manager 128.

In some examples, the cache manager 128 receives a read request (open command) associated with the collection of files, such as from a caller process. The cache manager 128 identifies the lock file 440 associated with the requested collection of files. The cache manager 128 checks if an exclusive lock is currently asserted in the lock file 440. In response to determining that the exclusive lock is not currently asserted or stored in the lock file 440, the cache manager 128 stores a non-exclusive lock (shared lock) in the lock file 440 and retrieves the reference 442 from the lock file 440. The cache manager 128 returns or provides the reference 442 to the caller process. The caller process can then directly access the collection of files stored in the collection of files 450 through the path or location specified in the reference 442.

In some examples, the cache manager 128 can determine that an exclusive lock is currently asserted or stored in the lock file 440. This can result from an incomplete package or collection of files being stored in the associated collection of files 450. For example, if the collection of files have not fully been downloaded or retrieved from the non-volatile storage device or the remote storage device, the lock file 440 can store an exclusive lock status. As another example, if the collection of files are stored in the collection of files 450 but are currently in the process of being evicted, the exclusive lock status can be stored in the lock file 440. The cache manager 128 can, in response, perform a blocking or non-blocking operation.

In the case of performing a blocking operation, the cache manager 128 can wait for a threshold period of time (e.g., 10 seconds) until the exclusive lock is no longer stored or asserted in the lock file 440. During the wait period, the cache manager 128 can continuously or periodically monitor the state of the lock file 440 to determine whether the exclusive lock is still being asserted or stored. Once the exclusive lock is no longer asserted or stored, the cache manager 128 returns or provides the reference 442 to the caller process. The caller process can then directly access the collection of files stored in the collection of files 450 through the path or location specified in the reference 442. If the threshold period of time elapses and the exclusive lock is still asserted (or a lock has not successfully been obtained over the lock file 440), the cache manager 128 transmits a notification to the caller process indicating that the lock has unsuccessfully been acquired.

In the case of performing a non-blocking operation, the cache manager 128 can re-attempt to obtain a lock or can re-determine if the exclusive lock is still asserted or stored in the lock file 440 a threshold number of times (e.g., three more times). If, after re-attempting to obtain the lock the threshold number of times, the cache manager 128 still fails to obtain the lock (e.g., the exclusive lock is still stored or asserted in the lock file 440), the cache manager 128 returns a notification to the caller process indicating failure to obtain access to the corresponding collection of files (e.g., the cache manager 128 transmits a notification to the caller process indicating that the lock has unsuccessfully been acquired). The caller process can then perform a put operation requesting that the collection of files be retrieved again from the non-volatile storage device or the remote storage device and placed in the storage device cache 126 of the data storage device 120-1. The collection of files that are retrieved again can overwrite previously stored collection of files in the collection of files 450 or can be stored in a new subfolder and associated with a new lock file.

In some examples, prior to or after generating the lock file 440 that points to the collection of files 450 in which the collection of files is stored, the cache manager 128 can receive a request to perform one or more data preprocessing operations on the collection of files, such as encryption, decryption, compression, and/or decompression operations. For example, the cache manager 128 can receive a request to obtain one or more temporary storage locations from the caller process. In response, the cache manager 128 can generate a temporary subfolder under or as part of the one or more temporary directories 460 and can retrieve and store the collection of files from the non-volatile storage device in the temporary subfolder. The cache manager 128 can return to the caller process an identification or path to the subfolder. The caller process can then access the temporary subfolder to perform the data preprocessing operations, such as decompression, on the collection of files.

The caller process can then instruct the cache manager 128 to move the collection of files that have been preprocessed (e.g., decompressed) to the hidden collection of files 450 or a new subfolder that is hidden. The cache manager 128 can generate or associate the lock file 440 with the hidden collection of files 450 or generate a new lock file for the new subfolder that stores the collection of files that have been preprocessed. Within the context of moving the collection of files, in some example operating systems, the move operation is performed by a move system call on the root directory and is an atomic operation that prevents corrupted artifacts (e.g., collection of files that is missing some files as part of the artifact) from entering the cache.

In some examples, the cache manager 128 can receive a probe command from a caller process. The cache manager 128 in response to the probe command, determines whether the collection of files is currently stored in the collection of files 450. The cache manager 128 transmits a response to the caller application indicative of whether the collection of data is currently stored in the subfolder 450. For example, the response can provide an identification of the lock file 440 associated with the collection of files and/or the lock status of the lock file 440.

The cache manager 128 can manage eviction or removal of the collection of files stored in the collection of files 450 based on the lock file 440. Specifically, the cache manager 128 can use the lock files, such as the lock file 440, that is associated with each particular collection of files stored in a respective hidden subfolder to control eviction of the associated collection of files on an atomic basis. The cache manager 128 can implement an eviction queue 500 to control eviction of the collection of files stored in the hidden subfolders, such as the collection of files 450.

Figure 5:
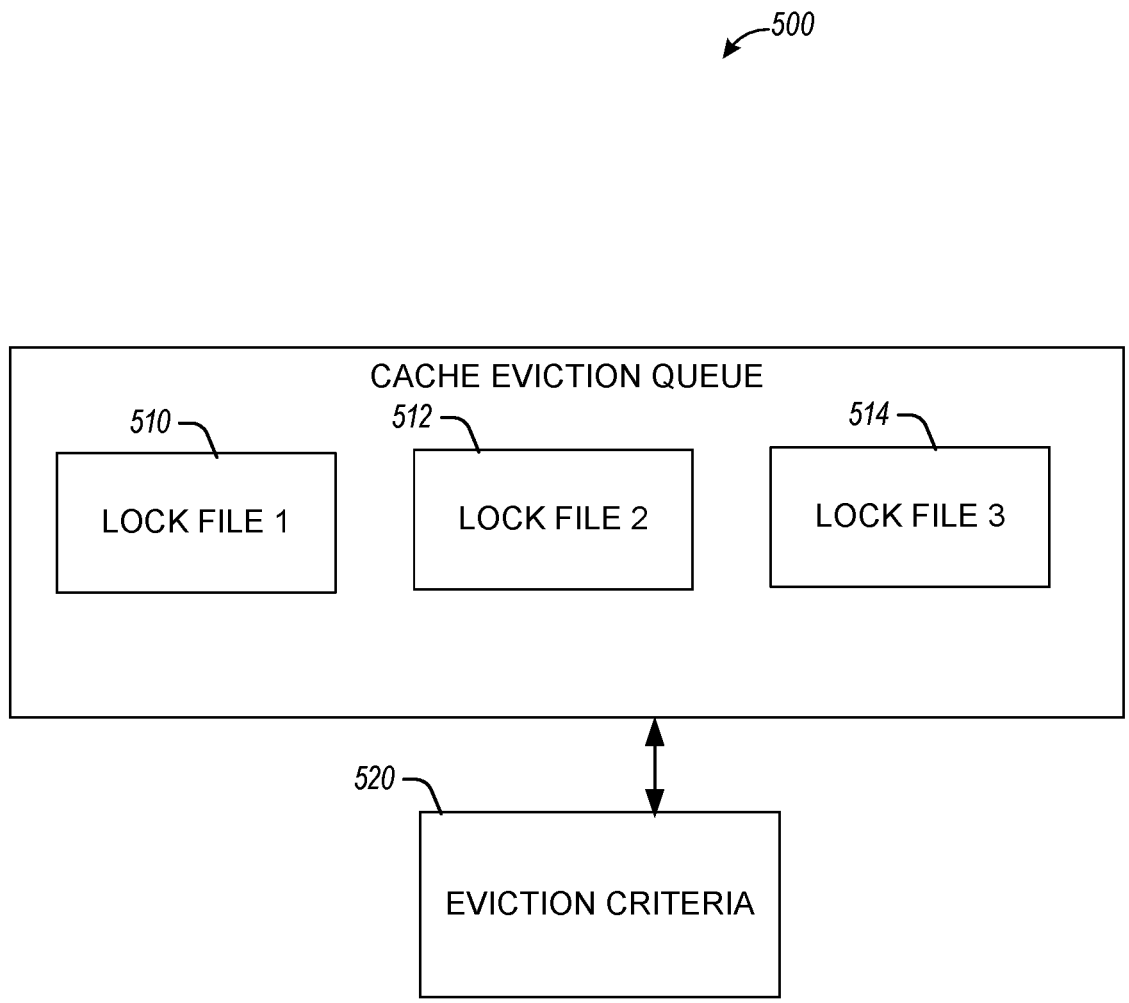
FIGS. 5-7 are flow diagrams illustrating operations of the network-based data platform in performing atomic file management on a cache associated with a non-volatile storage device, in accordance with some embodiments of the present disclosure.

FIG. 5 is a block diagram illustrating an example of the cache eviction queue 500 of the storage device cache 126 of the data storage device 120-1, in accordance with some embodiments of the present disclosure. The cache eviction queue 500 can include references to a plurality of lock files 510, 512, and 514. The references to the plurality of lock files 510, 512, and 514 can store a file path to the corresponding lock files (e.g., lock file 440 that is in the storage device cache 126). The cache eviction queue 500 can also include an eviction criteria 520 that is used to select which of the lock files 510, 512, and 514 to use to evict the corresponding collection of files from the respective hidden subfolder (e.g., hidden collection of files 450). The eviction criteria 520 can define a condition for triggering eviction, such as when a threshold amount of the space in the storage device cache 126 has been consumed or when a collection of files or the corresponding lock file reaches a certain age.

In some examples, the cache manager 128 automatically adds the reference to the lock file to the front of the cache eviction queue 500 when the lock file is initially created. The cache eviction queue 500 can receive a notification (e.g., an inotify event) when each lock file is accessed. For example, the cache manager 128 can receive a request from a caller process to access a particular collection of files. In response, the cache manager 128 identifies the lock file that references the hidden subfolder in which the particular collection of files is stored. The cache manager 128 sends a notification event to the cache eviction queue 500 that identifies the lock file that has been accessed. In some examples, the cache manager 128 does not send the notification directly. Rather, a caller process, as part of the operation of accessing the lock file, triggers a notification event from a separate process that monitors the file system. In this way, opening and reading the lock file can trigger an inotify event from the inotify operating system. The cache eviction queue 500, in response to receiving the notification event, identifies the reference to the lock file (e.g., reference to the lock file 510) in the cache eviction queue 500. The cache eviction queue 500 moves the identified reference to the lock file 510 to an earlier position in the queue, such as the top or front of the queue. In this way, the front of the queue or top of the queue represents the most recently used lock file corresponding to the most recently used collection of files and the back or bottom of the queue represents the least recently used (LRU) lock file corresponding to the least recently used collection of files.

The eviction criteria 520 can monitor the amount of storage currently being used in the storage device cache 126. For example, the eviction criteria 520 can include a module or process that accesses all of the lock files from the storage device cache 126 and adds up or accumulates the byte size information of each lock file. Namely, the eviction criteria 520 module can retrieve a first byte size information representing a total size of a collection of files associated with the first lock file 440 and can retrieve a second byte size information representing a total size of a collection of files associated with a second lock file. If no additional lock files are present, the eviction criteria 520 module adds up the first and second byte sizes which represents the total amount of space consumed by files in the storage device cache 126. The eviction criteria 520 module compares the total amount of space consumed to a threshold amount. In response to determining that the total amount of space transgresses (is greater than or equal to) the threshold amount, the eviction criteria 520 module can trigger an eviction process for one or more collections of files.

The eviction criteria 520 module can retrieve the reference to the lock file 514 that is at the bottom of the cache eviction queue 500. The eviction criteria 520 module can also retrieve the timestamp associated with the reference to the lock file 514. The eviction criteria 520 module can determine that the timestamp satisfies a minimum amount of time threshold (representing a minimum amount of time a collection of data needs to remain in the storage device cache 126 before being eligible for eviction). In response to determining that the timestamp satisfies the minimum amount of time threshold, the eviction criteria 520 module selects the lock file associated with the reference to the lock file 514 that is at the bottom of the cache eviction queue 500 for eviction. In such cases, the eviction criteria 520 module transmits a request to the cache manager 128 to evict or remove the collection of files associated with the reference to the lock file 514 that is at the bottom of the cache eviction queue 500. In response to determining that the timestamp fails to satisfy the minimum amount of time threshold, the eviction criteria 520 module selects the lock file associated with the reference to the lock file 512 that is adjacent to the reference to the lock file 514 that is at the bottom of the cache eviction queue 500 for eviction. In such cases, the eviction criteria 520 module transmits a request to the cache manager 128 to evict or remove the collection of files associated with the reference to the lock file 512.

The cache manager 128 identifies the lock file (e.g., lock file 440) that corresponds to the reference to the lock file that has been selected for eviction. The cache manager 128 determines a lock status of the identified lock file. For example, the cache manager 128 can determine that the lock status of the lock file 440 indicates that the lock is asserted or stored. In such cases, the cache manager 128 determines that the collection of data associated with the lock file 440 is not eligible for eviction. Namely, the cache manager 128 attempts to receive an exclusive lock on the lock file 440 in which case no other caller process can currently be accessing the corresponding collection of files and cannot receive a lock for the lock file 440. In response to determining that the exclusive lock has not been successfully obtained for the lock file 440, the cache manager 128 can either wait for a threshold period of time (e.g., 10 seconds) before attempting to obtain an exclusive lock on the lock file 440 or can indicate to the eviction criteria 520 module that the lock file and associated collection of files is not eligible for eviction. The eviction criteria 520 module can then select a different reference to a lock file to evict the corresponding collection of files.

In response to the cache manager 128 receiving successfully an exclusive lock over the lock file 440, the cache manager 128 begins transferring the collection of files stored in the collection of files 450 associated with the lock file 440 from the collection of files 450 to the storage location on the data storage device 120-1. When the lock file 440 stores or asserts an exclusive lock, no other caller process can obtain a lock or obtain access to the collection of files stored in the collection of files 450 associated with the lock file 440.

Figure 6:
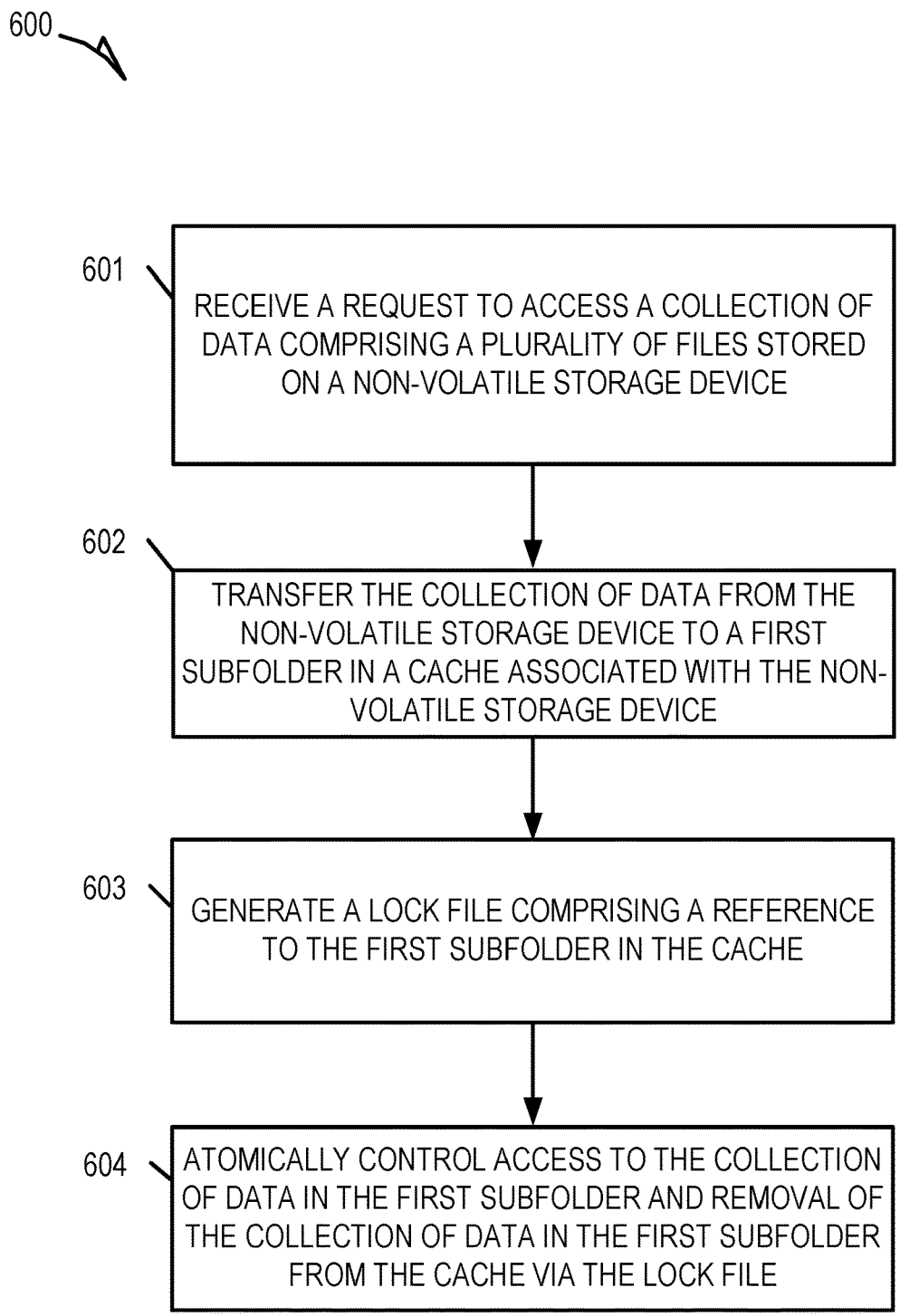
Figure 7:
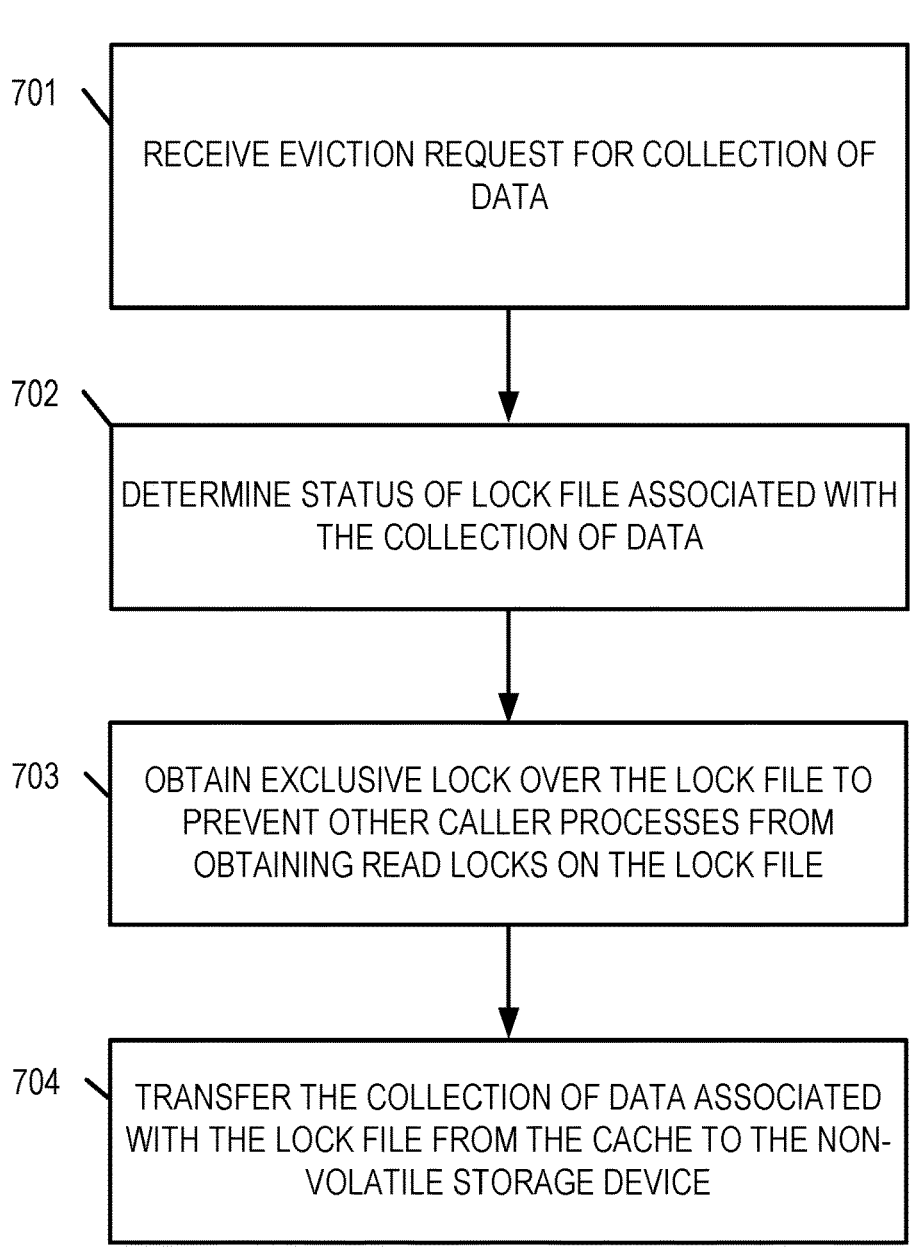

FIGS. 6-7 are flow diagrams illustrating operations of the network-based data platform 102 in performing a method or process 600 for atomic file cache management, in accordance with some embodiments of the present disclosure. The process 600 may be embodied in computer-readable instructions for execution by one or more hardware components (e.g., one or more processors) such that the operations of the process 600 may be performed by components of data platform 102 such as the cache manager 128 or the execution platform 110. Accordingly, the process 600 is described below, by way of example with reference thereto. However, it shall be appreciated that process 600 may be deployed on various other hardware configurations and is not intended to be limited to deployment within the data platform 102.

Depending on the embodiment, an operation of the process 600 may be repeated in different ways or involve intervening operations not shown. Though the operations of the process 600 may be depicted and described in a certain order, the order in which the operations are performed may vary among embodiments, including performing certain operations in parallel or performing sets of operations in separate processes.

At operation 601, the cache manager 128 receives a request to access a collection of data comprising a plurality of files stored on a non-volatile storage device (e.g., a remote storage device or cloud computing storage device), as discussed above.

At operation 602, the cache manager 128 in response to receiving the request, transfers the collection of data from the non-volatile storage device to a first subfolder in a cache associated with the non-volatile storage device, as discussed above.

At operation 603, the cache manager 128 generates a lock file comprising a reference to the first subfolder in the cache, as discussed above.

At operation 604, the cache manager 128 atomically controls access to the collection of data in the first subfolder and removal of the collection of data in the first subfolder from the cache via the lock file, as discussed above.

As shown in FIG. 7, the process 600 can further include a process 700, consistent with some embodiments. In some examples, the process 700 is performed subsequent to the process 600 or as part of operation 604 of process 600.

At operation 701, the cache manager 128 receives an eviction request for a collection of data, as discussed above.

At operation 702, the cache manager 128 determines a status of a lock file associated with the collection of data, as discussed above.

At operation 703, the cache manager 128 obtains an exclusive lock over the lock file to prevent other caller processes from obtaining locks on the lock file, as discussed above.

At operation 704, the cache manager 128 removes the collection of data associated with the lock file from the cache.

Described implementations of the subject matter can include one or more features, alone or in combination as illustrated below by way of example.

Example 1 is a method comprising: receiving a request to access a collection of data comprising a plurality of files stored on a non-volatile storage device; in response to receiving the request, transferring the collection of data from the non-volatile storage device to a first subfolder in a cache associated with the non-volatile storage device; generating a lock file comprising a reference to the first subfolder in the cache; and atomically controlling access to the collection of data in the first subfolder and removal of the collection of data in the first subfolder from the cache via the lock file.

Example 2 includes the method of Example 1, wherein the non-volatile storage device comprises a remote storage device, the operations further comprising preventing removal of the plurality of files stored in the first subfolder of the cache on an individual file basis.

Example 3 includes the method of any one or more of Examples 1 or 2, wherein the first subfolder comprises a hidden subfolder, the plurality of files stored in the first subfolder being removed on an all or nothing basis.

Example 4 includes the method of any one or more of Examples 1-3, wherein the operations for atomically controlling access further comprise: receiving, from a caller process, an open command associated with the collection of data; identifying the lock file associated with the collection of data; determining that a lock is successfully acquired on the lock file; and in response to determining that the lock has successfully been acquired on the lock file, providing the reference to the first subfolder to the caller process to enable the caller process to read the collection of data from the first subfolder.

Example 5 includes the method of any one or more of Examples 1-4, wherein the operations for atomically controlling access further comprise: receiving, from a caller process, an open command associated with the collection of data; identifying the lock file associated with the collection of data; determining that a lock is unsuccessfully acquired on the lock file; and delaying or preventing the caller process from accessing the first subfolder.

Example 6 includes the method of any one or more of Examples 1-5, wherein a blocking mode is enabled for reading the collection of data, and wherein the operations for atomically controlling access further comprise: monitoring the lock file to determine when the lock becomes available on the lock file; and in response to determining that the lock has become available, providing the reference to the first subfolder to the caller process.

Example 7 includes the method of any one or more of Examples 1-6, wherein a non-blocking mode is enabled for reading the collection of data, and wherein the operations for atomically controlling access further comprise: transmitting a notification to the caller process indicating that the lock has unsuccessfully been acquired.

Example 8 includes the method of any one or more of Examples 1-7, wherein the operations for atomically controlling access further comprise: receiving, from a caller application, a probe command associated with the collection of data; in response to the probe command, determining whether the collection of data is currently stored in the first subfolder; and transmitting a response to the caller application indicative of whether the collection of data is currently stored in the first subfolder.

Example 9 includes the method of any one or more of Examples 1-8, wherein the operations further comprise: receiving, from a caller process, a request for temporary space in the cache; and in response to receiving the request for the temporary space in the cache, generating a second subfolder in the cache comprising one or more temporary storage locations.

Example 10 includes the method of any one or more of Examples 1-9, wherein the operations further comprise: transferring the collection of data to the second subfolder prior to storing the collection of data in the first subfolder; performing one or more data preprocessing operations on the collection of data in the first subfolder to generate preprocessed data; and after completion of the one or more data preprocessing operations, transferring the preprocessed data to the second subfolder.

Example 11 includes the method of any one or more of Examples 1-10, wherein the one or more data preprocessing operations comprises at least one of an encryption operation, a decryption operation, a compression operation or a decompression operation.

Example 12 includes the method of any one or more of Examples 1-11, wherein the operations for atomically controlling access further comprise: receiving a request to remove the collection of data from the first subfolder associated with the lock file; determining that an exclusive lock is successfully acquired on the lock file; and in response to determining that the exclusive lock is successfully acquired on the lock file, using the reference to the first subfolder to transfer the collection of data from the first subfolder to a storage location on the non-volatile storage device.

Example 13 includes the method of any one or more of Examples 1-12 wherein the request to remove the collection of data is received from a background manager, the background manager performing operations comprising: determining that the lock file satisfies a least recently used (LRU) criterion.

Example 14 includes the method of any one or more of Examples 1-13 wherein the operations for determining that the lock file satisfies the LRU criterion comprise: generating a queue comprising a plurality of lock files, the plurality of lock files comprising the lock file, each of the plurality of lock files referencing a different subfolder in which a respective collection of data is stored; receiving a notification indicating that a request to access a given lock file has been received; and in response to receiving the notification, moving the given lock file to an earlier position in the queue.

Example 15 includes the method of any one or more of Examples 1-14 wherein the operations further comprise: determining that the lock file is at a last position in the queue and satisfies a time criterion comprising a minimum amount of time spent data is stored in the cache prior to being removed from the cache; and in response to determining that the lock file is at the last position in the queue, selecting the lock file for removal of the collection of data from the cache.

Example 16 includes the method of any one or more of Examples 1-15 wherein the lock file includes size information representing a total byte size of the first subfolder.

Example 17. A system comprising: one or more processors of a machine; and at least one memory storing instructions that, when executed by the one or more processors, cause the machine to perform operations implementing any one of example methods 1 to 16.

Example 18. A machine-readable storage device embodying instructions that, when executed by a machine, cause the machine to perform operations implementing any one of example methods 1 to 16.

Figure 8:
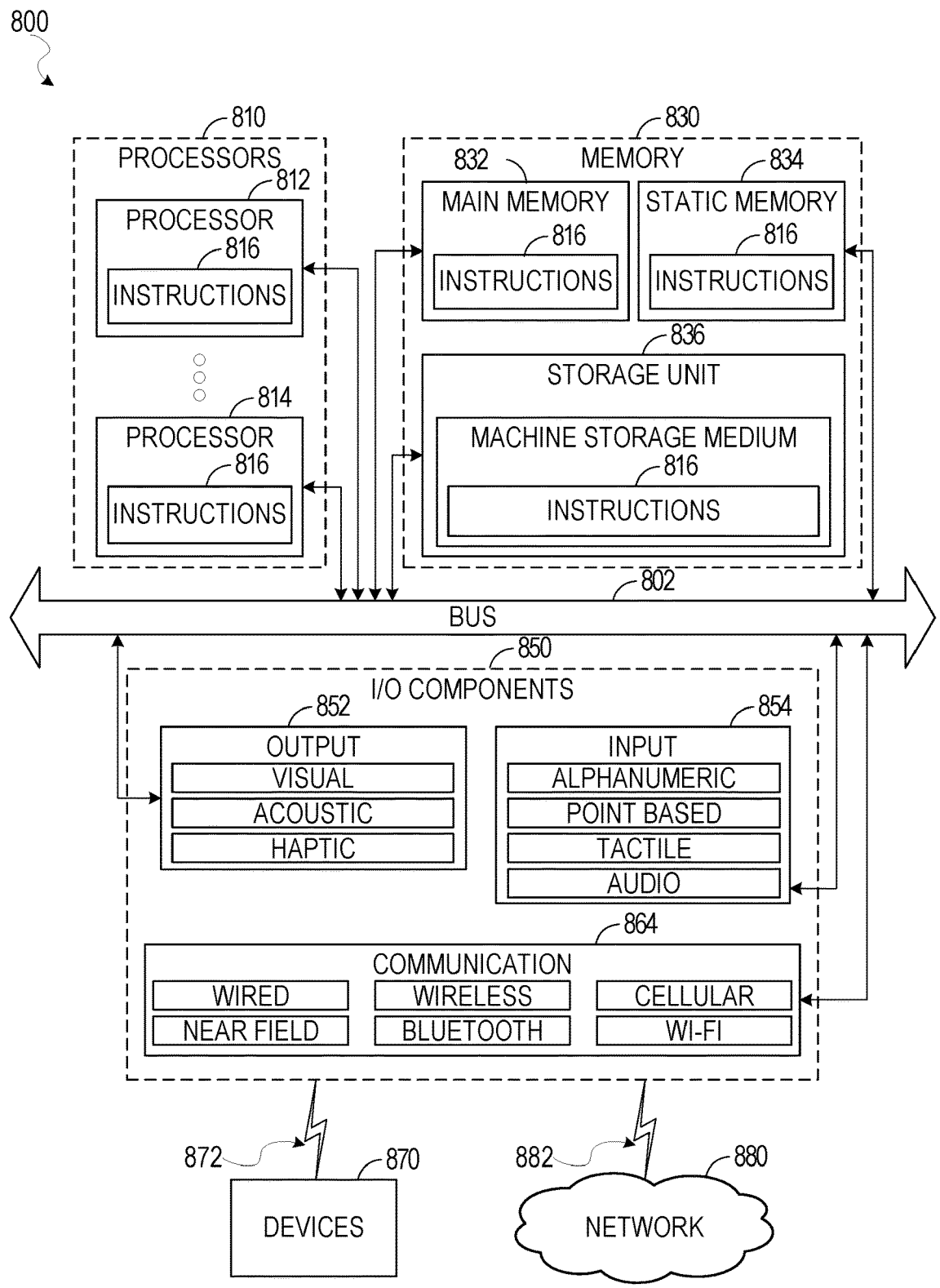
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., processes 600 and/or 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the processes 600 and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter.

Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor of a server; and
   at least one memory storing instructions that cause the at least one hardware processor to execute operations comprising:
   receiving, by the server, a request from a client device that is external to the server, to access a collection of data comprising a plurality of files stored on a storage device;
   in response to receiving the request, transferring the collection of data from the storage device to a first subfolder in a cache associated with the storage device;
   prior to granting access to the collection of data, generating, by the server, a lock file comprising a reference to the first subfolder in the cache;
   storing, on the server in the lock file and prior to granting the client device access to the collection of data, both an address that points to a storage location of the first subfolder in the cache and a lock status to control access and removal of the collection of data by the client device;

based on storing the lock file on the server, atomically controlling, by the server, access to the collection of data in the first subfolder and removal of the collection of data in the first subfolder from the cache via the lock file comprising the address and the lock status including updating the lock status that is stored in the lock file;

storing the lock file in a queue of lock files;

computing a total amount of storage currently being used in the cache of lock files by performing operations comprising:

retrieving, from a first lock file, a first byte size of a first collection of files referenced by the first lock file, the first collection of files associated with the first byte size retrieved from the first lock file being stored on a storage device outside of the cache; and retrieving, from a second lock file, a second byte size of a second collection of files referenced by the second lock file, the second collection of files associated with the second byte size retrieved from the second lock file being stored on the storage device outside of the cache;

retrieving from the first lock file a timestamp representing when the first collection of files has been retrieved from the storage device and stored in the cache;

computing an amount of time that the first collection of files has remained in the cache using the retrieved timestamp indicating when the first collection of files has been retrieved from the storage device;

comparing the amount of time that the first collection of files has remained in the cache to a minimum amount of time threshold;

allowing eviction of the first collection of files in response to determining the amount of time that the first collection of files has remained in the cache is greater than the minimum amount of time threshold;

preventing eviction of the first collection of files in response to determining the amount of time that the first collection of files has remained in the cache is less than the minimum amount of time threshold;

preventing removal of the plurality of files stored in the first subfolder of the cache on an individual file basis.

2. The system of claim 1, the operations comprising allowing the first collection of files to be evicted when the first lock file reaches a certain age, wherein the storage device comprises a non-volatile storage device including a remote storage device.

3. The system of claim 1, wherein the operations comprise:

determining that the first lock file corresponding to the first collection of files that is at a bottom of the queue of lock files;

determining that the amount of time that the first collection of files has remained in the cache fails to satisfy the minimum amount of time threshold;

in response to determining that the first lock file is at the bottom of the queue of lock files and that the amount of time that the first collection of files has remained in the cache fails to satisfy the minimum amount of time threshold, selecting the second lock file that is adjacent to the first lock file that is at the bottom of the queue of lock files for eviction; and transmitting a request to a cache manager to evict the second collection of files associated with the second lock file.

4. The system of claim 1, wherein the operations for atomically controlling access further comprise:

receiving, from a caller process, an open command associated with the collection of data;

identifying the lock file associated with the collection of data;

determining that a lock is successfully acquired on the lock file; and in response to determining that the lock has successfully been acquired on the lock file, providing the reference to the first subfolder to the caller process to enable the caller process to read the collection of data from the first subfolder.

5. The system of claim 1, wherein the operations for atomically controlling access further comprise:

receiving, from a caller process, an open command associated with the collection of data;

identifying the lock file associated with the collection of data;

determining that a lock is unsuccessfully acquired on the lock file; and delaying or preventing the caller process from accessing the first subfolder.

6. The system of claim 5, wherein a blocking mode is enabled for reading the collection of data, and wherein the operations for atomically controlling access further comprise:

waiting a threshold period of time for the lock on the lock file to become available to be successfully acquired;

during the threshold period of time, monitoring the lock file to determine when the lock becomes available on the lock file;

in response to determining that the lock has become available during the threshold period of time, providing the reference to the first subfolder to the caller process; and in response to determining that the lock has remained unavailable after the threshold period of time elapses, transmitting a notification to the caller process indicating that the lock on the lock file has unsuccessfully been acquired.

7. The system of claim 5, wherein a non-blocking mode is enabled for reading the collection of data, and wherein the operations for atomically controlling access further comprise:

transmitting a notification to the caller process indicating that the lock has unsuccessfully been acquired.

8. The system of claim 1, wherein the operations for atomically controlling access further comprise:

receiving, from a caller application, a probe command associated with the collection of data;

in response to the probe command, determining whether the collection of data is currently stored in the first subfolder; and transmitting a response to the caller application indicative of whether the collection of data is currently stored in the first subfolder.

9. The system of claim 1, wherein the operations further comprise:

receiving, from a caller process, a request for temporary space in the cache; and in response to receiving the request for the temporary space in the cache, generating a second subfolder in the cache comprising one or more temporary storage locations.

10. The system of claim 9, wherein the operations further comprise:

transferring the collection of data to the second subfolder prior to storing the collection of data in the first subfolder;
performing one or more data preprocessing operations on the collection of data in the first subfolder to generate preprocessed data; and
based on completion of the one or more data preprocessing operations, atomically transferring the preprocessed data to the second subfolder.

11. The system of claim 1, wherein the operations further comprise:
adding the first and second byte sizes retrieved from the first and second lock files to determine the total amount of storage currently being used in the cache;
comparing the total amount of storage currently being used in the cache to a threshold amount; and
in response to determining that the total amount of storage currently being used in the cache transgresses the threshold amount, triggering eviction of one or more of collections of files associated with one or more of the lock files stored in the queue.

12. The system of claim 1, wherein the operations for atomically controlling access further comprise:
receiving a request to remove the collection of data from the first subfolder associated with the lock file;
determining that an exclusive lock is successfully acquired on the lock file; and
in response to determining that the exclusive lock is successfully acquired on the lock file, using the reference to the first subfolder to transfer the collection of data from the first subfolder to a storage location on the storage device.

13. The system of claim 12, wherein the request to remove the collection of data is received from a background manager, the background manager performing operations comprising:
determining that the lock file satisfies a least recently used (LRU) criterion.

14. The system of claim 13, wherein the operations for determining that the lock file satisfies the LRU criterion comprise:
generating the queue comprising a plurality of lock files, the plurality of lock files comprising the lock file, each of the plurality of lock files referencing a different subfolder in which a respective collection of data is stored;
receiving a notification indicating that a request to access a given lock file has been received; and
in response to receiving the notification, moving the given lock file to an earlier position in the queue.

15. The system of claim 14, wherein the operations further comprise:
determining that the lock file is at a last position in the queue; and
in response to determining that the lock file is at the last position in the queue, selecting the lock file for removal of the collection of data from the cache.

16. The system of claim 1, wherein the operations further comprise:
storing a total byte size of the first subfolder in the lock file together with the lock status and the address, the lock status indicating at least one of whether a lock has been asserted or whether an exclusive lock has been asserted.

17. A method comprising:
receiving, by a server, a request from a client device that is external to the server, to access a collection of data comprising a plurality of files stored on a storage device;
in response to receiving the request, transferring the collection of data from the storage device to a first subfolder in a cache associated with the storage device;
prior to granting access to the collection of data, generating, by the server, a lock file comprising a reference to the first subfolder in the cache;
storing, on the server in the lock file and prior to granting the client device access to the collection of data, both an address that points to a storage location of the first subfolder in the cache and a lock status to control access and removal of the collection of data by the client device;
based on storing the lock file on the server, atomically controlling, by the server, access to the collection of data in the first subfolder and removal of the collection of data in the first subfolder from the cache via the lock file comprising the address and the lock status including updating the lock status that is stored in the lock file;
storing the lock file in a queue of lock files;
computing a total amount of storage currently being used in the cache of lock files by performing operations comprising:
retrieving, from a first lock file, a first byte size of a first collection of files referenced by the first lock file, the first collection of files associated with the first byte size retrieved from the first lock file being stored on a storage device outside of the cache; and
retrieving, from a second lock file, a second byte size of a second collection of files referenced by the second lock file, the second collection of files associated with the second byte size retrieved from the second lock file being stored on the storage device outside of the cache;
retrieving from the first lock file a timestamp representing when the first collection of files has been retrieved from the storage device and stored in the cache;
computing an amount of time that the first collection of files has remained in the cache using the retrieved timestamp indicating when the first collection of files has been retrieved from the storage device;
comparing the amount of time that the first collection of files has remained in the cache to a minimum amount of time threshold;
allowing eviction of the first collection of files in response to determining the amount of time that the first collection of files has remained in the cache is greater than the minimum amount of time threshold;
preventing eviction of the first collection of files in response to determining the amount of time that the first collection of files has remained in the cache is less than the minimum amount of time threshold;
preventing removal of the plurality of files stored in the subfolder of the cache on an individual file basis.

18. The method of claim 17, wherein the storage device comprises a non-volatile remote storage device.

19. The method of claim 17, wherein the first subfolder comprises a hidden subfolder, the plurality of files stored in the first subfolder being removed on an all or nothing basis.

20. The method of claim 17, further comprising:
receiving, from a caller process, an open command associated with the collection of data;
identifying the lock file associated with the collection of data;

determining that a lock is successfully acquired on the lock file; and in response to determining that the lock has successfully been acquired on the lock file, providing the reference to the first subfolder to the caller process to enable the caller process to read the collection of data from the first subfolder.

21. The method of claim 17, further comprising:

receiving, from a caller process, an open command associated with the collection of data;

identifying the lock file associated with the collection of data;

determining that a lock is unsuccessfully acquired on the lock file; and delaying or preventing the caller process from accessing the first subfolder.

22. The method of claim 21, wherein a blocking mode is enabled for reading the collection of data, further comprising:

monitoring the lock file to determine when the lock becomes available on the lock file; and in response to determining that the lock has become available, providing the reference to the first subfolder to the caller process.

23. The method of claim 21, wherein a non-blocking mode is enabled for reading the collection of data, and wherein atomically controlling access further comprises:

transmitting a notification to the caller process indicating that the lock has unsuccessfully been acquired.

24. A computer-storage medium comprising instructions that, when executed by a processor of a machine, configure the machine to perform operations comprising:

receiving, by a server, a request from a client device that is external to the server, to access a collection of data comprising a plurality of files stored on a storage device;

in response to receiving the request, transferring the collection of data from the storage device to a first subfolder in a cache associated with the storage device;

prior to granting access to the collection of data, generating, by the server, a lock file comprising a reference to the first subfolder in the cache;

storing, on the server in the lock file and prior to granting the client device access to the collection of data, both an address that points to a storage location of the first subfolder in the cache and a lock status to control access and removal of the collection of data by the client device;

based on storing the lock file on the server, atomically controlling, by the server, access to the collection of data in the first subfolder and removal of the collection of data in the first subfolder from the cache via the lock file comprising the address and the lock status including updating the lock status that is stored in the lock file;

storing the lock file in a queue of lock files;

computing a total amount of storage currently being used in the cache of lock files by performing operations comprising:

retrieving, from a first lock file, a first byte size of a first collection of files referenced by the first lock file, the first collection of files associated with the first byte size retrieved from the first lock file being stored on a storage device outside of the cache; and retrieving, from a second lock file, a second byte size of a second collection of files referenced by the second lock file, the second collection of files associated with the second byte size retrieved from the second lock file being stored on the storage device outside of the cache;

retrieving from the first lock file a timestamp representing when the first collection of files has been retrieved from the storage device and stored in the cache;

computing an amount of time that the first collection of files has remained in the cache using the retrieved timestamp indicating when the first collection of files has been retrieved from the storage device;

comparing the amount of time that the first collection of files has remained in the cache to a minimum amount of time threshold;

allowing eviction of the first collection of files in response to determining the amount of time that the first collection of files has remained in the cache is greater than the minimum amount of time threshold;

preventing eviction of the first collection of files in response to determining the amount of time that the first collection of files has remained in the cache is less than the minimum amount of time threshold;

preventing removal of the plurality of files stored in the first subfolder of the cache on an individual file basis.

25. The computer-storage medium of claim 24, wherein the storage device comprises a non-volatile remote storage device.

26. The computer-storage medium of claim 24, wherein the first subfolder comprises a hidden subfolder, the plurality of files stored in the first subfolder being removed on an all or nothing basis.

27. The computer-storage medium of claim 24, wherein the operations for atomically controlling access further comprise:

receiving, from a caller process, an open command associated with the collection of data;

identifying the lock file associated with the collection of data;

determining that a lock is successfully acquired on the lock file; and in response to determining that the lock has successfully been acquired on the lock file, providing the reference to the first subfolder to the caller process to enable the caller process to read the collection of data from the first subfolder.

28. The computer-storage medium of claim 24, wherein the operations for atomically controlling access further comprise:

receiving, from a caller process, an open command associated with the collection of data;

identifying the lock file associated with the collection of data;

determining that a lock is unsuccessfully acquired on the lock file; and delaying or preventing the caller process from accessing the first subfolder.

29. The computer-storage medium of claim 28, wherein a blocking mode is enabled for reading the collection of data, and wherein the operations for atomically controlling access further comprise:

monitoring the lock file to determine when the lock becomes available on the lock file; and in response to determining that the lock has become available, providing the reference to the first subfolder to the caller process.

30. The computer-storage medium of claim 28, wherein a non-blocking mode is enabled for reading the collection of data, and wherein the operations for atomically controlling access further comprise:

transmitting a notification to the caller process indicating that the lock has unsuccessfully been acquired.

\* \* \* \* \*

UNITED STATES PATENT AND TRADEMARK OFFICE
CERTIFICATE OF CORRECTION

| | | |
|---|---|---|
| PATENT NO. | : 12,026,129 B2 | Page 1 of 1 |
| APPLICATION NO. | : 17/657229 | |
| DATED | : July 2, 2024 | |
| INVENTOR(S) | : Aya et al. | |

It is certified that error appears in the above-identified patent and that said Letters Patent is hereby corrected as shown below:

In the Claims

In Column 28, Line 56, in Claim 17, after "the", insert --first--

Signed and Sealed this
Ninth Day of September, 2025

Coke Morgan Stewart
*Acting Director of the United States Patent and Trademark Office*